(12) United States Patent
Ye (10) Patent No.: US 7,680,411 B2
(45) Date of Patent: Mar. 16, 2010

(54) IMAGING OPTICAL SYSTEM FOR MULTI-FOCUS CAMERA (75) Inventor: Zhijin Ye, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 557 days.

(21) Appl. No.: 11/602,185

(22) Filed: Nov. 21, 2006

(65) Prior Publication Data

US 2007/0116447 A1 May 24, 2007

(30) Foreign Application Priority Data

Nov. 21, 2005 (JP) ............................. 2005-335896

(51) Int. Cl.
G03B 42/00 (2006.01)
H04N 9/74 (2006.01)
(52) U.S. Cl. ...................... 396/334; 348/584
(58) Field of Classification Search .......... 396/322, 396/332–334; 348/584, 588
See application file for complete search history.

(56) References Cited

U.S. PATENT DOCUMENTS

| 4,255,033 A | * | 3/1981 | Rose | ............................ 396/334 |
| 4,541,007 A | * | 9/1985 | Nagata | ........................... 348/48 |
| 5,361,108 A | * | 11/1994 | Kamata et al. | ............... 396/333 |
| 2002/0176712 A1 | * | 11/2002 | Brown | ........................... 396/427 |
| 2003/0020814 A1 | * | 1/2003 | Ono | ........................ 348/220.1 |
| 2005/0270387 A1 | * | 12/2005 | Watanabe et al. | ....... 348/240.99 |

FOREIGN PATENT DOCUMENTS

| JP | 09-139878 A | 5/1997 |
| JP | 2004-96269 A | 3/2004 |
| JP | 2006-229789 A | 8/2006 |
| JP | 2006-229802 A | 8/2006 |

* cited by examiner

Primary Examiner—W. B. Perkey
Assistant Examiner—Leon W Rhodes
(74) Attorney, Agent, or Firm—Sughrue Mion, PLLC (57) ABSTRACT Imaging optical systems of imaging units of a multi-focus camera are set to form respective focal planes in a shooting space at different distances from the multi-focus camera. Front depths of field of the imaging optical systems are set to be so deep that they reach the adjacent focal planes that are arranged on the camera side of the respective focal planes. Focal lengths and magnifications of the imaging optical systems are so defined that images of any subjects of the same size are taken in the same size regardless of where the subjects are located in the shooting space.

2 Claims, 10 Drawing Sheets

IMAGING OPTICAL SYSTEM FOR MULTI-FOCUS CAMERA

FIELD OF THE INVENTION

The present invention relates to a multi-focus camera that can take images of many subjects simultaneously in a predetermined shooting space for a predetermined shooting time. More specifically, the present invention relates to imaging optical systems of the multi-focus camera, whereby any subjects in the shooting space are imaged sharply and those subjects which are equal in size are imaged in the same size, regardless of the subject distance.

BACKGROUND OF THE INVENTION

Such cameras that have a wide-angle lens covering a wide field of vision are used for many purposes, like as a security camera, an observatory camera for observing crops or disasters, a camera for on-the-spot inspection, a camera for recording sport events, or a TV camera. A super-wide angle camera using a fisheye lens is also well known. As covering a wide field of vision, the camera with the wide-angle lens or the fisheye lens can record the whole information of the subjects existing in a wide range of the field.

On shooting or broadcasting some sport event or the like, also a camera using a telephoto lens or a zoom lens has been used for close-upping important incidents of the events with higher sharpness. Because the field of vision of the telephoto lens and that of the zoom lens at a long focal length is narrow, the camera continually follows the subject, e.g. an individual player, in order to capture a scene at the important moment.

With the camera using the wide-angle lens, the captured images do not provide detailed information on individual subjects, and the sharpness of the images is inferior. On the contrary, with the camera using the telephoto lens or the zoom lens, it is possible to capture a clear image of the particular subject, such as a player, which is followed by the camera. However, it is impossible to obtain pictorial information of other scenes outside the field of the telephoto lens or zoom lens.

To solve the above problems, it has conventionally been done using a plurality of cameras for taking many subjects simultaneously in a wide range of field, wherein each camera uses a lens whose field is not so wide as the fisheye lens or the wide-angle lens but not so narrow as the telephoto lens or the zoom lens. The plurality of cameras are located dispersedly and activated continuously. For example, Japanese Laid-open Patent Application Hei 09-139878 discloses such a solution.

However, for use as security cameras or observatory cameras, it is necessary to install a certain number of cameras in order to reduce blind spots. For shooting or relay broadcasting a sport event by a plurality of cameras, it is necessary to dispose at least an operator for each camera. In addition, if the camera operator fails to follow every movement of a subject, the camera does not catch some information on the subject.

To solve this problem, the present applicant invented an imaging system using a multi-focus camera that is provided with a lot of imaging units of different focal lengths. But it has been difficult to take an in-focus image of every subject at every place in the shooting space. It has also been difficult to take images in the same size from those subjects which are equal in size, if these subjects exit at different places in the shooting space.

SUMMARY OF THE INVENTION

In view of the foregoing, a primary object of the present invention is to provide a multi-focus camera, wherein a plurality of optical systems of different focal lengths have such focal planes that the multi-focal camera can take an in-focus image of every subject at every place in a predetermined shooting space, without the need for adjusting the focuses of the lenses.

Another object of the multi-focus camera of the present invention is that those subjects which are equal in size are imaged in the same size at any places of the predetermined shooting space.

To achieve the above objects, a multi-focus camera of comprises a number of imaging units, each of which has an imaging optical system and an imaging device, imaging optical systems of the imaging units being set to form respective focal planes at different distances from the multi-focus camera in a particular shooting space, wherein front depths of field of the imaging optical systems are set to be deep enough to reach those focal planes which are adjacent to and arranged on the camera side of the respective focal planes or a front face of the shooting space, and magnifications of the imaging optical systems are so defined that images of any subjects of the same size are taken in the same size regardless of the position of the focal planes.

The imaging optical systems preferably satisfy the following condition:

$$Ls_n - Ls_{n-1} \leq Df_n (n \geq 2).$$

wherein $Ls_n$ represents a distance from a focal plane that is in the n-th position from the front of the shooting space to an imaging unit that is focused on the n-th focal plane, $Df_n$ represents a front depth of field of the imaging optical system of the imaging unit that is focused on the n-th focal plane.

The optical systems of the imaging units more preferably satisfy the following condition:

$$fn = Ls_n \times m/(m+1)$$

wherein m and fn represent a magnification and a focal distance of the imaging optical system of the imaging unit that is focused on the n-th focal plane, respectively.

Since the intermediate spaces between the focal planes are included in the depths of field of the respective optical system of the imaging unit, high-definition images are obtained from anywhere in the shooting space.

Defining the focal length and the magnification of the optical system of each imaging unit to satisfy the above condition, any subjects of the same size are imaged in the same size wherever the subjects exit in the shooting space.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
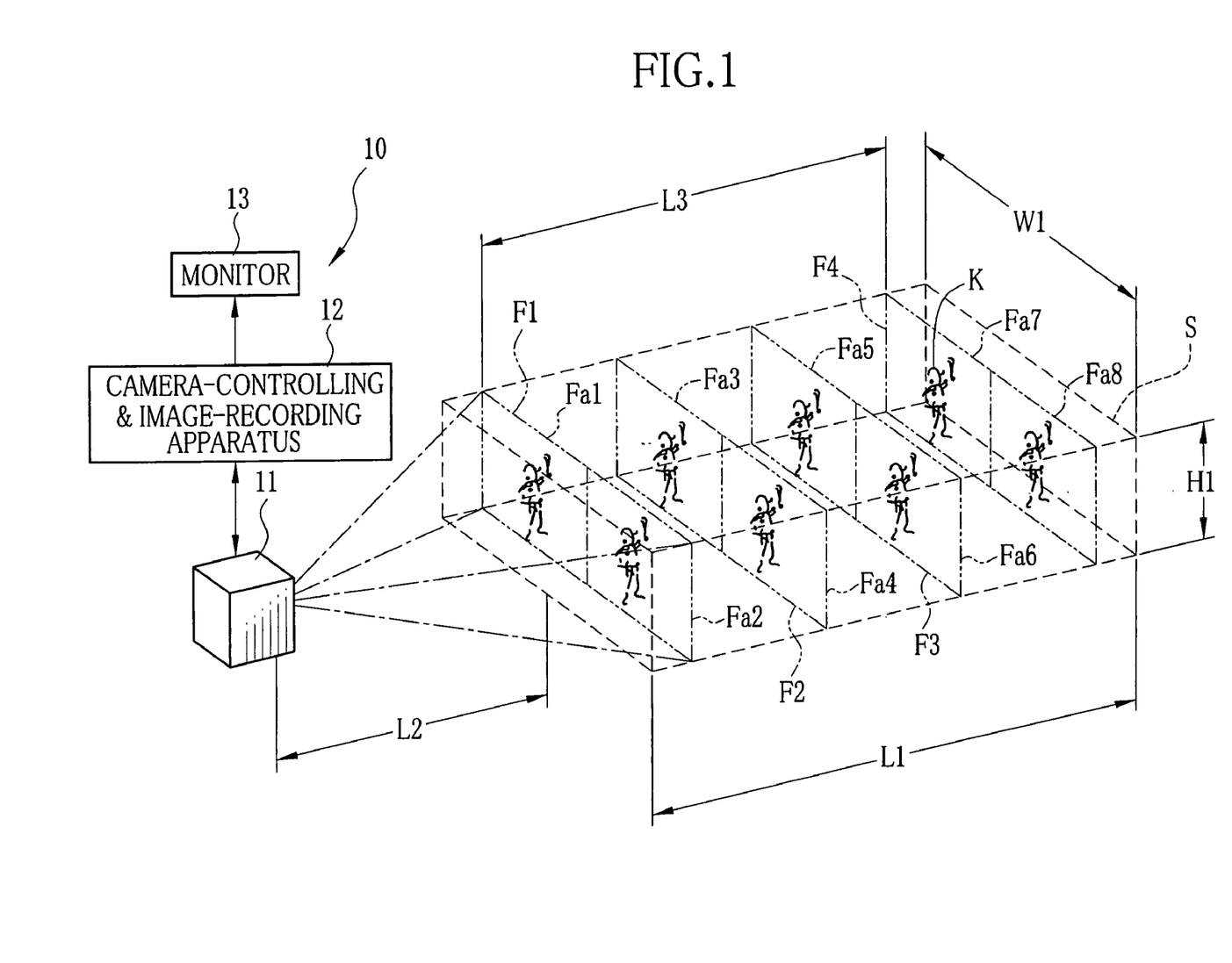
FIG. 1 is an explanatory view illustrating a shooting space of an imaging system according to an embodiment of the present invention.

FIG. 1 schematically shows a shooting space of an imaging system 10 of the present invention. The imaging system 10 consists of a multi-focus camera 11, a camera-controlling and image-recording apparatus 12, and a monitor 13. The multi-focus camera 11 can continue imaging a certain shooting space S in an appropriate shooting time. The camera-controlling and image-recording apparatus 12 controls the multi-focus camera 11 and records images shot by the multi-focus camera 11, and the monitor 13 displays images presently shot by the multi-focus camera 11, or images that have been shot by the multi-focus camera 11.

For example, the shooting space S has a depth L1 of 43.9 m, a width W1 of 4 m, a height H1 of 1.5 m, so it is elongated in the direction of the depth L1. In this example, the multi-focus camera 11 is positioned at a distance L2 of 6 m from a front plane of the shooting space S in the direction of the depth L1, wherein the front plane has the width W1.

Figure 2:
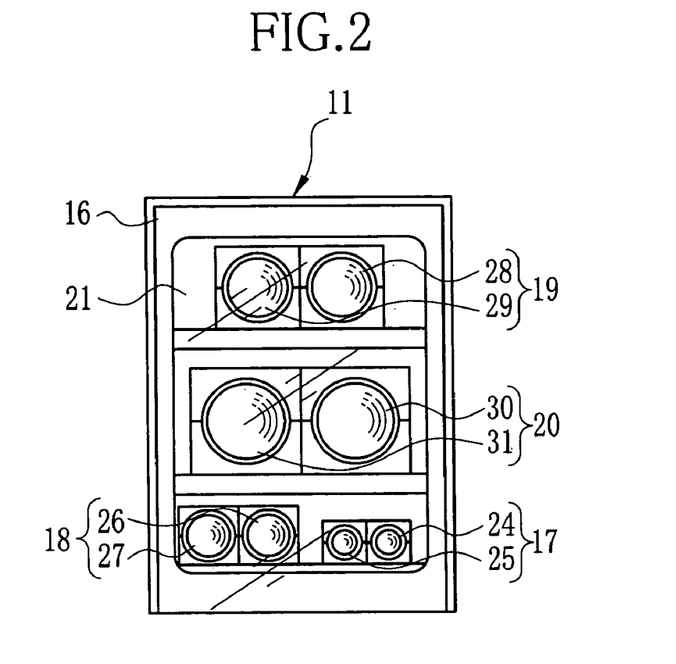
FIG. 2 is a front view of a multi-focus camera of the imaging system.

As shown in FIG. 2, the multi-focus camera 11 is provided with first to fourth image layer units 17, 18, 19 and 20, which actually image the shooting space S, and are mounted in a substantially box-shaped housing 16. The first to fourth image layer units 17 to 20 consist of first to eighth imaging units 24, 25, 26, 27, 28, 29, 30 and 31, wherein two of the imaging units 24 and 25, 26 and 27, 28 and 29, and 30 and 31 are arranged horizontally side by side to constitute each of the image layer units 17 to 20, respectively. The first to fourth image layer units 17 to 20 are displaced vertically from each other, and face to the shooting space S through a transparent window 21 of the housing 16.

The first to fourth image layer units 17 to 20 have individual focal points on first to fourth focal planes F1, F2, F3 and F4, respectively. For example, the fourth focal plane F4 is set at a distance L3 of 32.2 m from the first focal plane F1, and the second and third focal planes F2 and F3 are arranged at equal intervals between the first and fourth focal planes F1 and F4.

The imaging units 24 to 31 are set to have individual focal points in first to eighth focal areas Fa1, Fa2, Fa3, Fa4, Fa5, Fa6, Fa7 and Fa8, which are defined by dividing each of the first to fourth focal planes F1 to F4 into halves in the direction of the width W1, as shown in FIG. 1. The imaging units 24 to 31 take images from the first to eighth focal areas Fa1 to Fa8, respectively, wherein those subjects which are equal in size are imaged in the same size regardless of which focal area the subjects are exiting in. Furthermore, spaces between the respective focal planes F1 to F4 are covered with the respective depths of fields of the imaging units 24 to 31, so the multi-focus camera 11 can take in-focus images from any places of the shooting space S.

Figure 3:
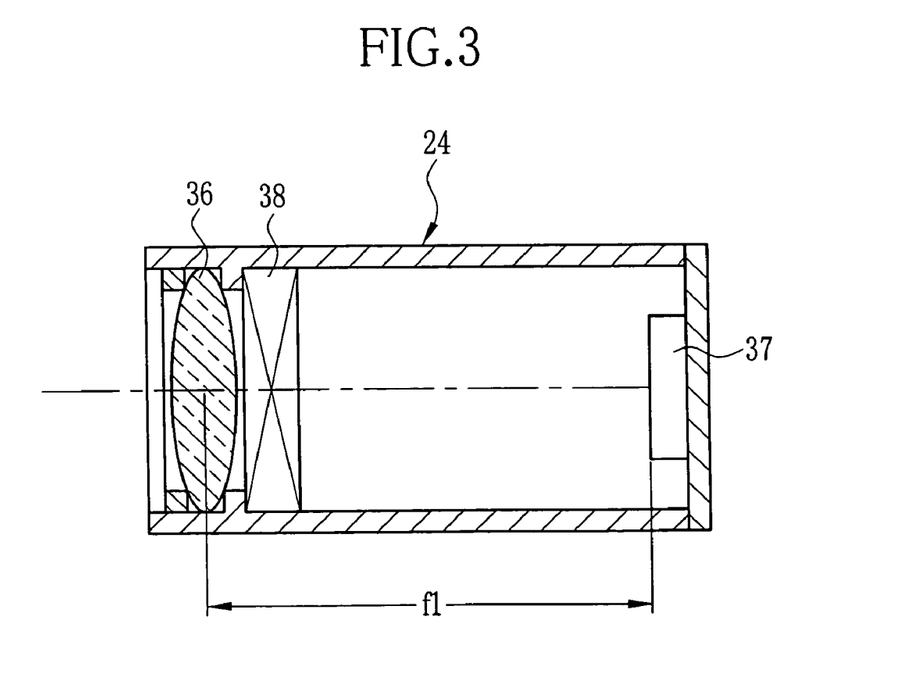
FIG. 3 is a sectional view of an imaging unit of the multi-focus camera.

FIG. 3 shows the first imaging unit 24 in section. The first imaging unit 24 is constituted of a lens barrel 35, a taking lens 36 mounted in a front face of the lens barrel 35, an imaging device 37 mounted in a rear end of the lens barrel 35, and a shutter unit 38 mounted in between the taking lens 36 and the imaging device 37. An example of the imaging device 37 is a CCD image sensor or a CMOS image sensor. The second to eighth imaging units 25 to 31 are structured substantially the same way as the first imaging unit 24, except that they have different taking lenses of different focal lengths according to the distances to the corresponding focal planes.

Although it is not illustrated in detail, the imaging units 24 to 31 are so mounted in the housing 16 that their vertical and horizontal positions, their upward and downward inclination angles, and rotational direction of the imaging device 37 are adjustable according to the shooting space S. In a case where the dimensions of the shooting space S are determined, like when the shooting space S is a stadium or field for a particular sport, it is possible to configure the imaging units of the multi-focus camera according to the determined dimensions of the shooting space S.

Although the multi-focus camera 11 is provided with eight imaging units 24 to 31, the number of imaging units is not limited to the present embodiment, but may be modified depending upon how large the shooting space to cover is, or how many subjects exit in the shooting space. Also the vertical positions of the respective image layer units 17 to 20 are not limited to the present embodiment, but may be modified appropriately.

Figure 4:
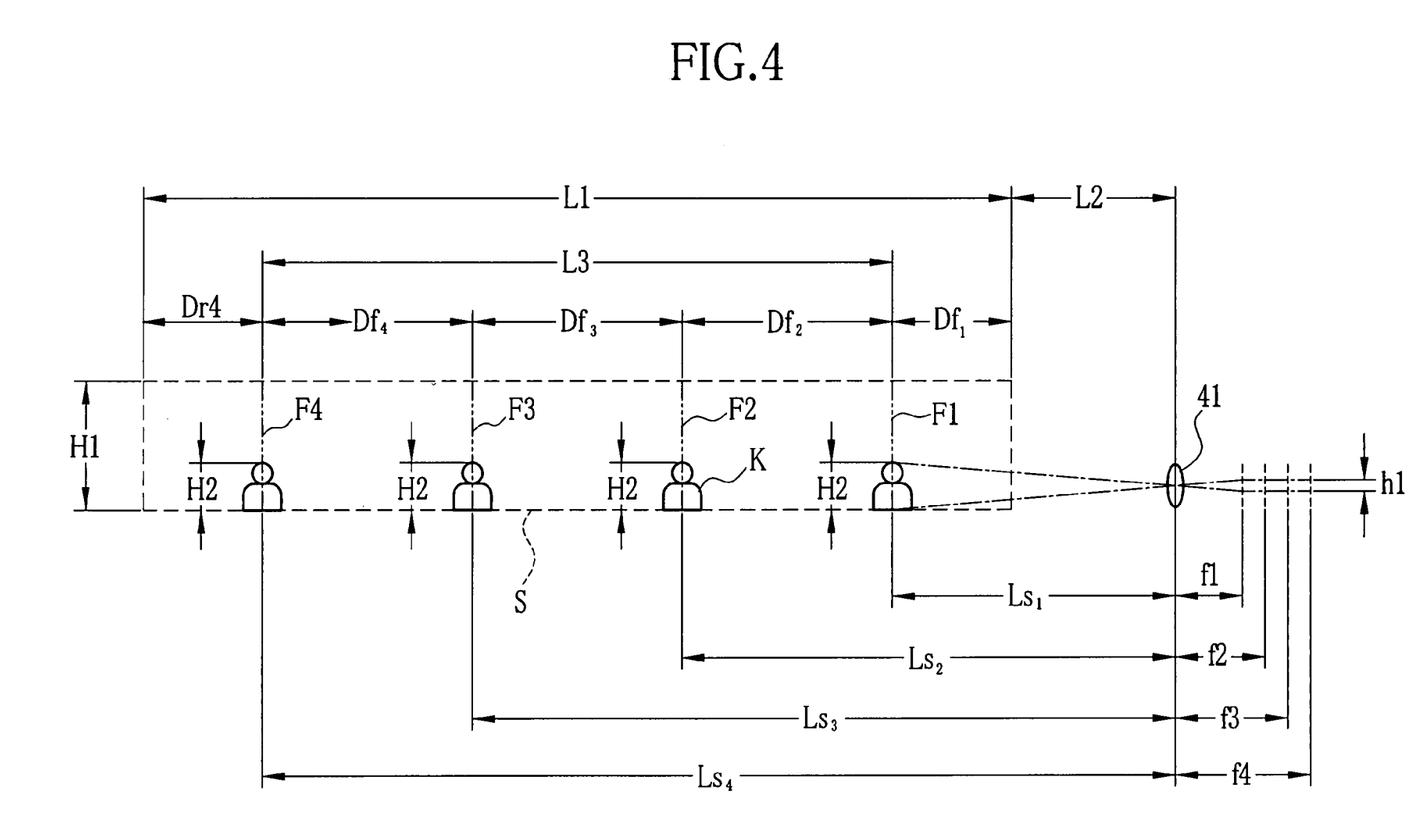
FIG. 4 is an explanatory diagram illustrating a relationship between focal planes and a shooting space of the multi-focus camera.

FIG. 4 shows a relationship between the shooting space S and in-focus ranges of the first to eighth imaging units 24 to 31. A reference number 41 representatively designates the taking lenses of the imaging units 24 to 31, which are positioned at the distance L2 from the front of the shooting space S. As described above, the first to fourth focal planes F1 to F4 are arranged one after another in the direction of the depth L1 of the shooting space S, in this order from the camera side. Providing that "$Ls_n$" represents a distance from the taking lens 41 to a focal plane that is in the n-th position from the front of the shooting space S, "$Df_n$" represents a front depth of field of an imaging unit that is focused on the n-th focal plane, "m" represents a magnification of this imaging unit, and "fn" represents a focal distance of the imaging unit focused on the n-th focal plane, the respective imaging units 24 to 31 are set to satisfy the following conditions:

$Ls_n - Ls_{n-1} \leq Df_n (n \geq 2)$.

$fn = Ls_n \times m/(m+1)$        (2)

Since the third to eighth imaging units 26 to 31, which are focused on the second to fourth focal planes F2, F3 and F4, satisfy the condition (1), front depths of field $Df_2$ to $Df_4$ are so deep that they reach the adjacent focal planes F1, F2 and F3 that are arranged on the camera side of the second to fourth focal planes F2, F3 and F4, respectively. Note that the first and second imaging units 24 and 25, which are focused on the first focal plane F1, have such a front depth of field $Df_1$ that covers from the first focal plane F1 to the front face of the shooting space S. On the other hand, the seventh and eighth imaging units 30 and 31, which are focused on the fourth focal plane F4, have such a rear depth of field Dr4 that covers from the fourth focal plane F4 to a rear face of the shooting space S. Thus, the whole shooting space S is included in the in-focus range of the multi-focus camera 11.

Defining the focal length fn to satisfy the condition (2) enables taking images in the same size h1 from any subjects K of the same size H2 regardless of where the subjects K are located in the shooting space S. For example, if the subject K is a player playing in a field, the multi-focus camera 11 can continuously shoot the player in the same size without fail while the player is moving fast across the field.

Figure 5:
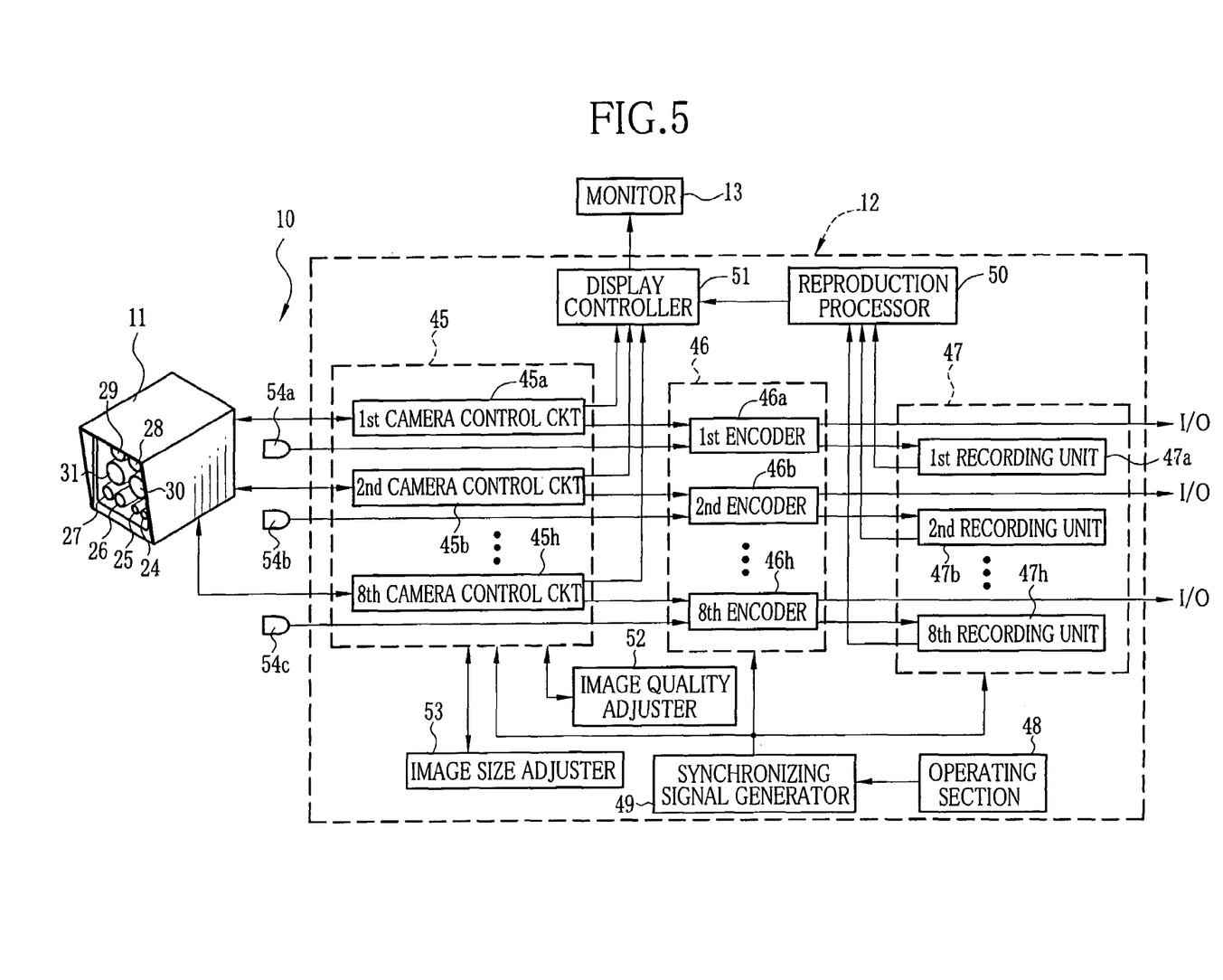
FIG. 5 is a block diagram illustrating an internal structure of a camera-controlling and image-recording apparatus.

FIG. 5 shows the interior of the camera-controlling and image-recording apparatus 12. The camera-controlling and image-recording apparatus 12 controls the multi-focus camera 11 to capture still images, or moving images, e.g. at 30 frames per second. The camera-controlling and image-recording apparatus 12 also controls the exposure of the imaging units each individually. Furthermore, the camera-controlling and image-recording apparatus 12 records data of the captured images and reads the recorded data to display the captured images on the monitor 13. In the display mode, the camera-controlling and image-recording apparatus 12 is operated to designate quality of the image to display, and perform simple editorial operations, such as image-trimming, image-relay-stitching between appropriate two or more of the imaging units, seamless image stitching of the moving images, image-composition with previous scenes, and extraction of still images from the moving images.

The camera-controlling and image-recording apparatus 12 is constituted of a camera controller 45, an encoder section 46, a recording section 47, an operating section 48, a synchronizing signal generator 49, a reproduction processor 50, a display controller 51, an image quality adjuster 52, an image size adjuster 53 and other minor elements. For the purpose of recording audio signals while the multi-focus camera 11 is shooting the moving images, first to eighth microphones 54*a*, 54*b*, 54*c*, 54*d*, 54*e*, 54*f*, 54*g* and 54*h* are placed in the vicinity of the first to eighth focal areas Fa1 to Fa8 of the shooting space S, which correspond to the first to eighth imaging unit 24 to 31 respectively. Audio signals collected through the microphones 54*a* to 54*h* are fed to the encoder section 46.

The camera controller 45 consists of first to eighth camera control circuits 45*a*, 45*b*, 45*c*, 45*d*, 45*e*, 45*f*, 45*g* and 45*h*, which control the first to eighth imaging units 24 to 31 respectively. The first to eighth camera control circuits 45*a* to 45*h* control gain for each of analog image signals that are fed from the respective imaging devices of the first to eighth imaging units 24 to 31, convert the image signals into digital image data, process the digital image data for white-balance controlling and other image-processing, and feed the processed image data to the encoder 46 and the display controller 51.

The encoder section 46 consists of first to eighth encoders 46*a*, 46*b*, 46*c*, 46*d*, 46*e*, 46*f*, 46*g* and 46*h* which correspond to the first to eighth camera controller circuits 45*a* to 45*h* respectively. The first to eighth encoders 46*a* to 46*h* encode the digital image data, which are fed from the first to eighth camera controller circuits 45*a* to 45*h*. For example, the image data of a still image is converted into a JPEG still image file, whereas the image data of moving images is converted into a MPEG4 moving image file. The still image file or the moving image file as produced through the first to eighth encoders 46*a* to 46*h* are fed to the recording section 47 and also sent through a not-shown I/O interface to an editorial device or the like.

The recording section 47 consists of the first to eighth recording units 47*a*, 47*b*, 47*c*, 47*d*, 47*e*, 47*f*, 47*g* and 47*h* which correspond to the first to eighth encoders 46*a* to 46*h* respectively. The first to eighth recording units 47*a* to 47*h*, each of which is a memory card reader/writer for reading and writing data from and in a memory card, record the still or moving image files as output from the first to eighth encoders 46*a* to 46*h*, respectively.

For example, the first to eighth camera control circuits 45*a* to 45*h* and the first to eighth encoders 46*a* to 46*h* are each structured as an extension board, wherein an appropriate number of extension boards may be formed on a single substrate, so that the number of the control circuits and encoders is adjustable to the number of imaging units of the multi-focus camera 11. Also the first to eighth recording units 47*a* to 47*h* are each structured as an independent memory card reader/writer, so that the number of recording units is adjustable to the number of imaging units of the multi-focus camera 11. Thus, the imaging system is adjustable to a variety of shooting spaces and subjects.

Note that the number of camera control circuits of the camera controller 45, the number of encoders of the encoder section 46, and the number of recording units of the recording section 47 are not limited to the present embodiment, but should be modified in correspondence with the number of imaging units constituting the multi-focus camera 11.

The camera-controlling and image-recording apparatus 12 is operated through an operating section 48. On starting or stopping shooting or reproducing the images, the synchronizing signal generator 49 is also used for synchronizing the operation on the operating section 48 with the camera controller 45, the encoder section 46 and the recording section 47.

Figure 6:
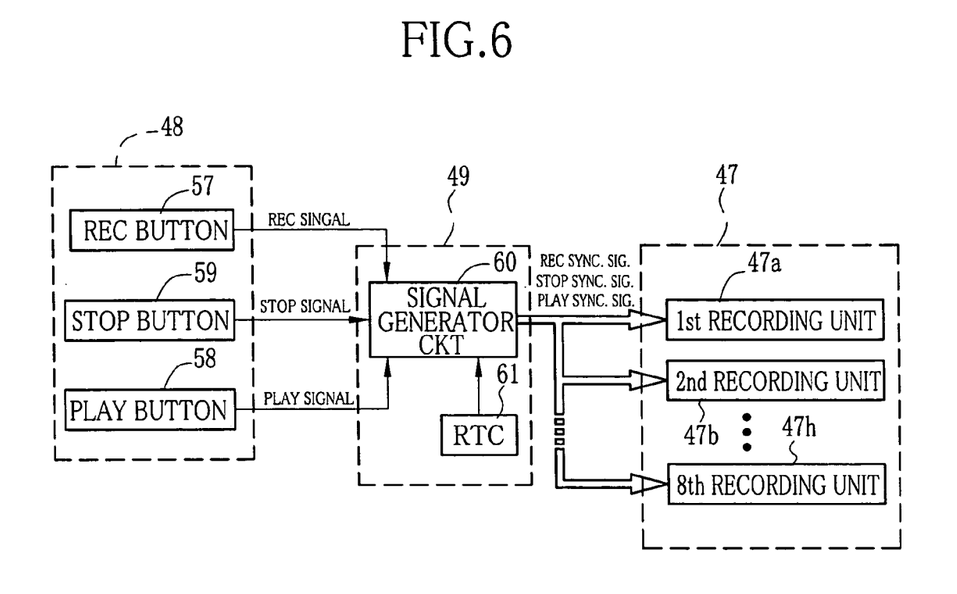
FIG. 6 is a block diagram illustrating internal structures of an operating section, a synchronizing signal generator of the camera-controlling and image-recording apparatus.

FIG. 6 shows the interior of the operating section 48 and the synchronizing signal generator 49. The operating section 48 is provide with a recording button (REC button) 57 for starting shooting, a play button 58 for starting reproducing the shot images, and a stop button 59 for stopping shooting or reproducing the images. The synchronizing signal generator 49 consists of a signal generator circuit 60 that is constituted of a microcomputer or the like, and a real time clock (RTC) 61 that supplies the signal generator circuit 60 with a clock signal.

Figure 7:
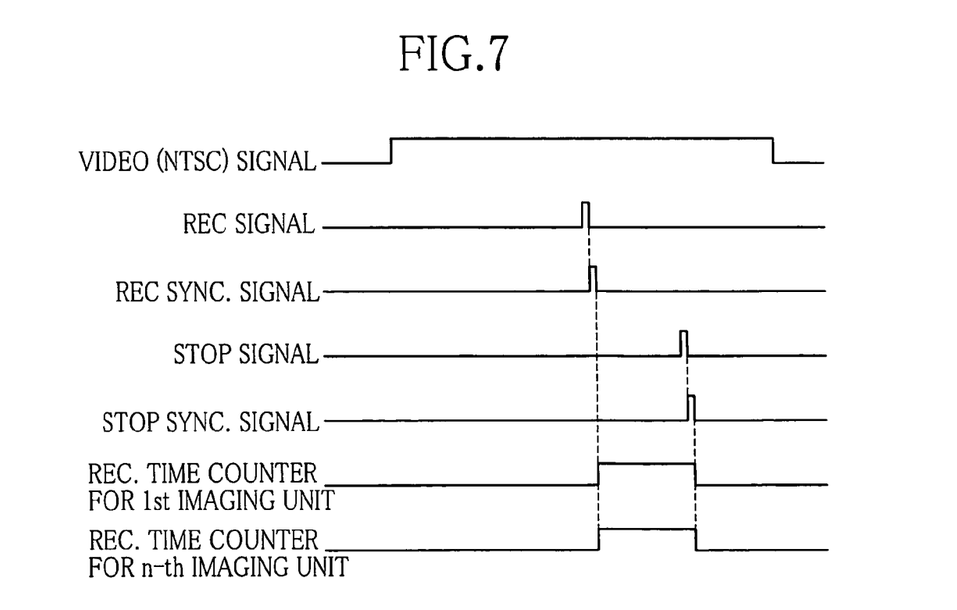
FIG. 7 shows timing charts of signals generated in the camera control and image recording apparatus.

As shown by the timing charts of FIG. 7, while the multi-focus camera 11 and the camera-controlling and image-recording apparatus 12 are working, the images shot by the first to eighth imaging units 24 to 31 are converted into video signals and supplied to the monitor 13, so the monitor 13 displays so-called camera-through images. When the REC button 57 of the operating section 48 is operated, a recording (REC) signal is output to the signal generator circuit 60. Then the signal generator circuit 60 generates a recording (REC) synchronizing signal in synchronism with the clock signal from the RTC 61, and feeds it to the respective circuits or units of the camera controller 45, the encoder section 46 and the recording section 47. Thereby, the first to eighth recording units 47*a* to 47 simultaneously start recording the moving images as shot by the first to eighth imaging units 24 to 31, while counting the recording time by not-shown recording time counters. When the stop button 59 is operated, a stop signal is output to the signal generator circuit 60, and the signal generator circuit 60 outputs a stop synchronizing signal in synchronism with the clock signal from the RTC 61, and feeds it to the respective circuits or units of the camera controller 45, the encoder section 46 and the recording section 47. Thereby, all of the imaging units 24 to 31 simultaneously stop shooting.

When the play button 58 is operated, a play signal is output to the signal generator circuit 60, and the signal generator circuit 60 generates a play-synchronizing signal in synchronism with the clock signal from the RTC 61, and feeds it to the respective circuits or units of the camera controller 45, the encoder section 46 and the recording section 47. Thereby, the images recorded by the first to eighth recording units 47a to 47h are simultaneously displayed on the monitor 13, in the way as described in detail later.

In this way, the images are synchronously shot by the first to eighth imaging units 24 to 31 and synchronously recorded by the camera-controlling and image-recording apparatus 12, so it is easy to discriminate starting positions of the respective moving images. Therefore, the moving images shot by the respective imaging units 24 to 31 can be stitched or edited without any staggering between their time axes.

In a case where higher accuracy of synchronization is required, the signal generator circuit 60 may generate a recording standby signal before the recording start signal, to make the camera controller 45, the encoder section 46 and the recording section 47 ready for the recording. There after when the recording start signal is generated, the recording is started.

Figure 8:
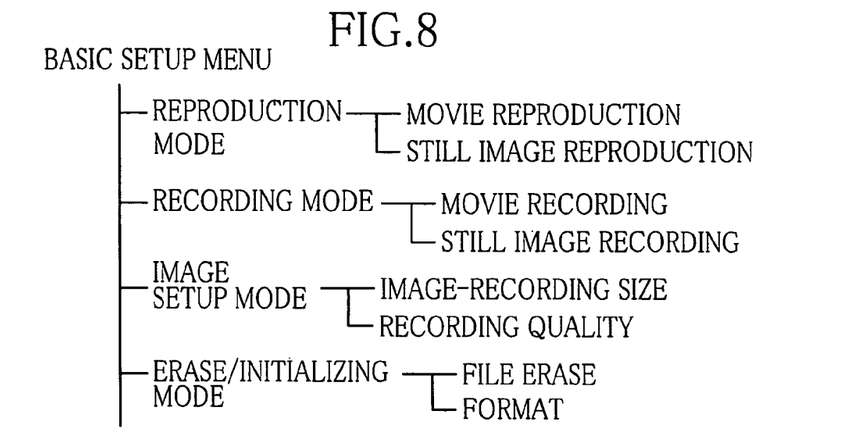
FIG. 8 is a hierarchical diagram illustrating a structure of a basic set menu.

FIG. 8 shows a basic setup menu indicating basic contents for setting up the first to eighth imaging units 24 to 31. The basic setup menu is hierarchically structured. The basic setup can be done on the imaging units each individually or all together.

In a reproduction mode, it is possible to select what kind of image file is to be reproduced. That is, the reproduction mode is provided with a movie reproduction mode for reproducing the moving image, and a still image reproduction mode for reproducing the still images. In a recording mode, it is possible to select what kind of image file is to be recorded. That is, the recording mode is provided with a movie recording mode for recording the moving image, and a still image recording mode for recording the still images. An image setup mode is for setting up image conditions for the recording. The image setup mode is provided with an image-recording size selection mode for selecting the image-recording size among several options, such as CIF (Common Intermediate Format) size and VGA (Video Graphics Array) size, and a recording quality selection mode for selecting the compression ratio of encoding among several options, such as normal, high-definition and super-high-definition. A erase/initializing mode is a mode concerning a memory card that is attached to each of the recording units, and is provided with a file erasing mode for erasing an appropriate file from the memory card, and a formatting mode for initializing the memory card.

Figure 9:
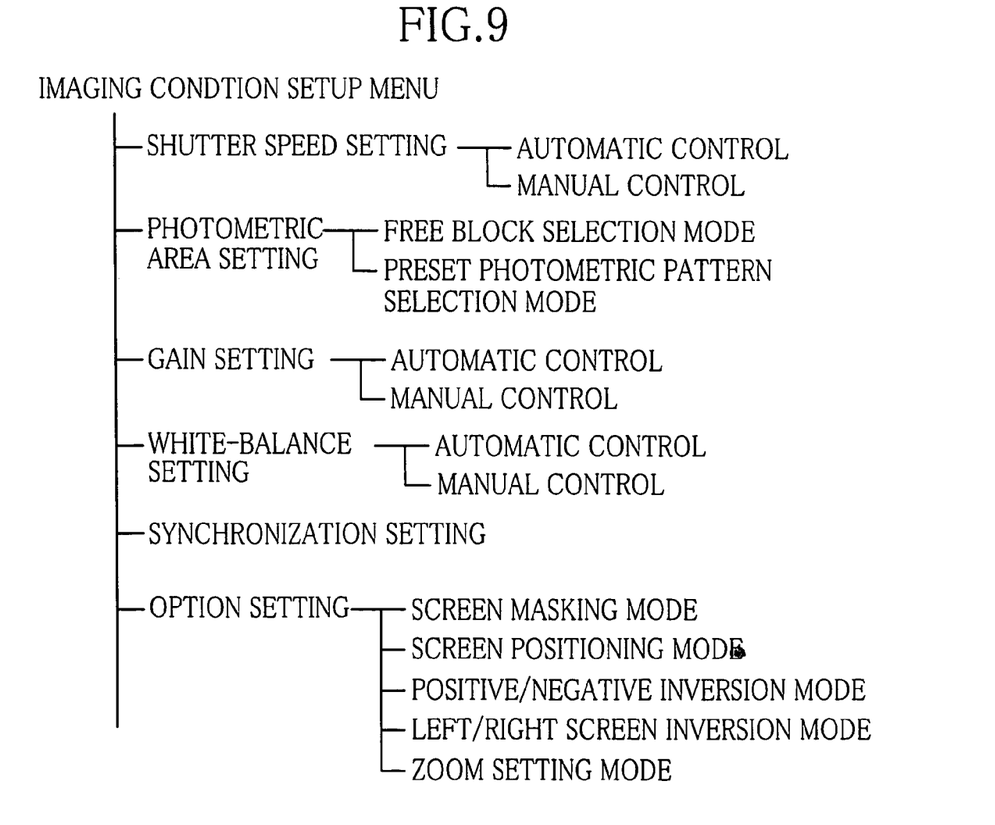
FIG. 9 is a hierarchical diagram illustrating a structure of an imaging set menu.

FIG. 9 shows an imaging condition setup menu for setting properties relating to the imaging. Like the basic setup menu, the imaging condition setup menu is served for setting the imaging units each individually or all together.

A shutter speed setting mode is for setting shutter speed of each shutter unit of the individual imaging unit, and is provided with an automatic control mode where the shutter speed is automatically adjusted to the subject brightness, and a manual control mode where the shutter speed is selected among several grades ranging from $1/60$ seconds to $1/12000$ seconds. A synchronization setting mode is for setting the synchronizing signal for the respective circuits and units of the camera controller 45, the encoder section 46 and the recording section 47. An option setting mode is for making simple editorial treatments on the image during the imaging, and is provided with a screen masking mode, a screen positing mode, a positive/negative inversion mode, a left/right screen inversion mode, and a zoom setting mode.

Figure 10A:
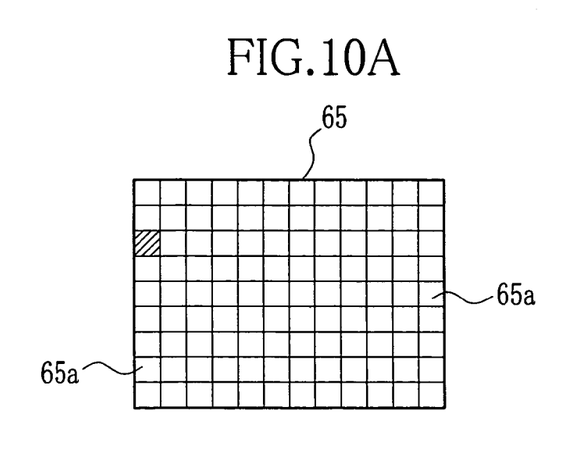
FIGS. 10A, 10B, 10C, 10D and 10E are explanatory diagrams, each illustrating an example of a photometric area.
Figure 10B:
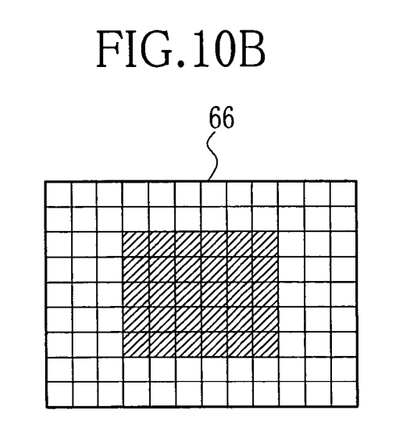
Figure 10C:
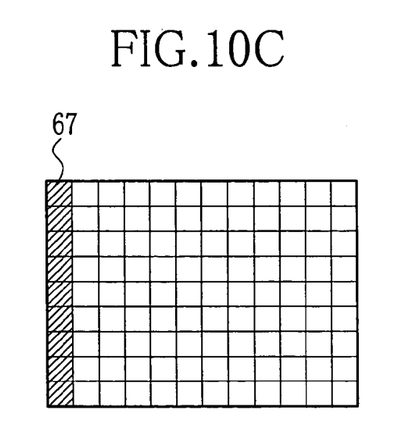
Figure 10D:
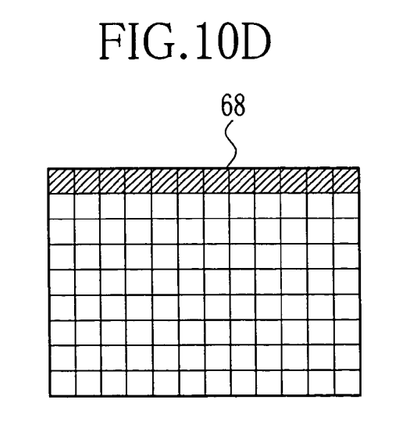
Figure 10E:
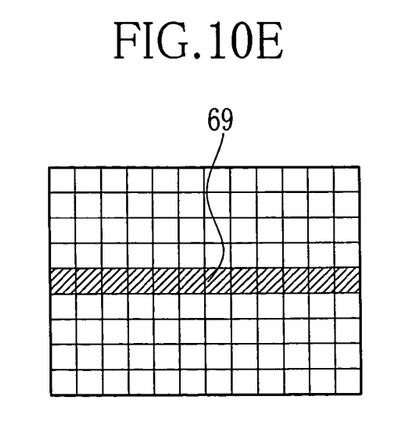

A photometric area setting mode is for setting a photometric area where the imaging devices of the respective imaging units 24 to 31 measure the subject brightness. As shown in FIG. 10A, a light receiving surface 65 of the imaging device 37 of the first imaging unit 24 is divided into 12 9 photometric blocks 65a. In a free block selection mode, any one or more of the photometric blocks 65a may be selected among the imaging system 108 photometric blocks 65a, as shown for example by a hatched portion in FIG. 10A. In this mode, a pattern view of the light receiving surface 65 is displayed on the monitor 13, so that an operator may select appropriate photometric blocks 65a on the pattern view.

In a preset photometric pattern selection mode, it is possible to select one of preset photometric patterns 66, 67, 68 and 69. As the photometric area is selectable on each of the imaging units, the imaging units can take images more finely in the corresponding areas.

A gain setting mode is for controlling amplitude of the analog image signal output from the imaging device of each of the imaging units 24 to 31. The gain setting mode is provided with an automatic control mode where the amplitude is automatically adjusted to the subject brightness, and a manual control mode where the amplitude is manually selected among several grades. A white-balance setting mode is for setting white-balance according to color temperature of illumination light. The white-balance setting mode is provided with an automatic control mode and a manual control mode. In the automatic control mode, the white-balance is automatically adjusted to the subject brightness, whereas in the manual control mode the white-balance is manually selected among several grades.

Figure 11A:
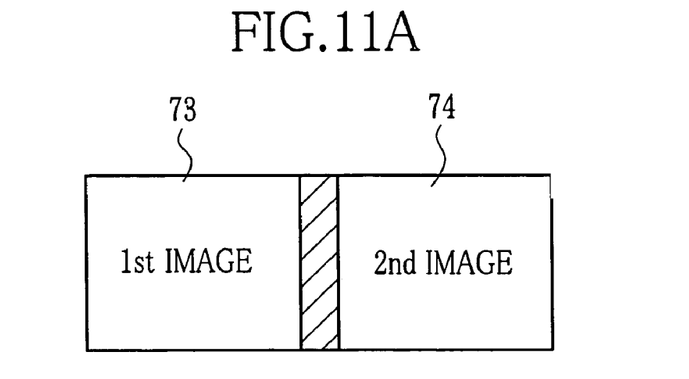
FIGS. 11A, 11B and 11C are explanatory diagrams illustrating how an image quality controller adjusts gain and white-balance of respective images as shot by different imaging units of the multi-focus camera.

On stitching the images between two or more of the first to eighth imaging units 24 to 31, if there are differences in gain and white-balance between the imaging units, the stitched image will look strange. Therefore, the gain and the white-balance are adjusted to each other between the imaging units in the automatic control modes for the gain and the white-balance. For example, in order to adjust the gain and the white-balance of the first imaging unit 24 and those of the second imaging unit 25 to each other, shooting ranges of these imaging units 24 and 25 are set to overlap each other, so that a first image 73 shot by the first imaging unit 24 partly overlap a second image 74 shot by the second imaging unit 25, as shown in FIG. 11A.

Figure 12:
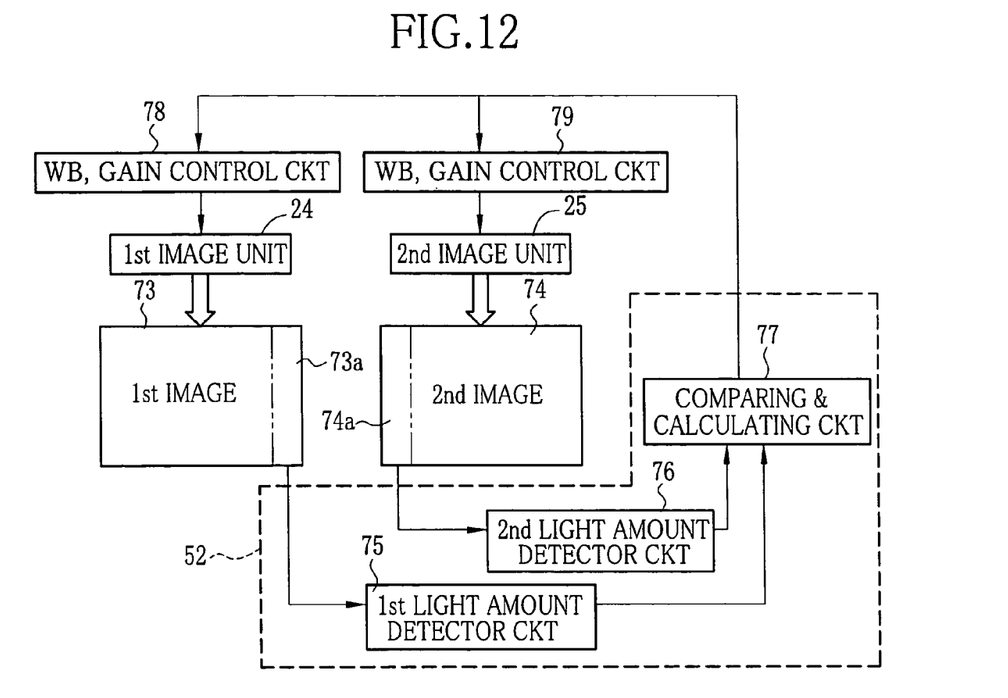
FIG. 12 is a block diagram illustrating an internal structure of the image quality controller.

The gain control and the white balance control are performed by the image quality adjuster 52. As shown in FIG. 12, the image quality adjuster 52 is provided with a number of light amount detector circuits, e.g. a first light amount detector circuit 75 and a second light amount detector circuit 76, and a comparing and calculating circuit 77. The first light amount detector circuit 75 detects a light amount of an overlapped portion 73a of the first image 73, whereas the second light amount detector circuit 76 detects a light amount of an overlapped portion 74a of the first image 74. The comparing and calculating circuit 77 compares the detected light amounts, and calculates such gains and white-balance values that make the first and second images 73 and 74 have the same light amount in non-overlapped portions. In this example, the calculated gains and white-balance values are fed to white-balance (WB) and gain control circuits 78 and 79 of the camera control circuits 45a and 45b, to control the gain and the white-balance of the first and second imaging units 24 and 25. Thereby, the images shot by the different imaging units may be stitched or edited with fine quality.

Figure 11B:
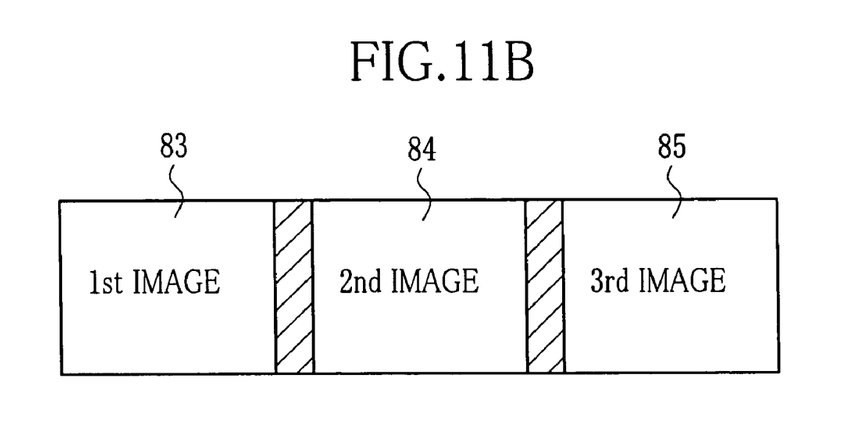
Figure 11C:
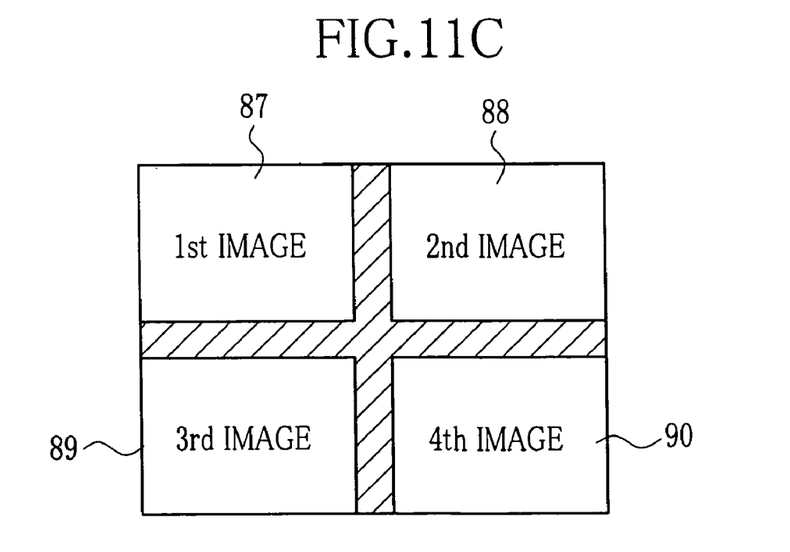

It is possible to adjust the gain and the white-balance between three images shot by different imaging units, while overlapping the three images 83, 84 and 85 as shown in FIG. 11B. It is also possible to adjust the gain and the white-balance between four images shot by different imaging units, while overlapping the four images 87, 88, 89 and 90 as arranged in a matrix, as shown in FIG. 11C. Insofar as the different imaging units can shoot the same subject, it is possible to adjust the gain and the white-balance between these imaging units even if they are located distant from one another.

Figure 13A:
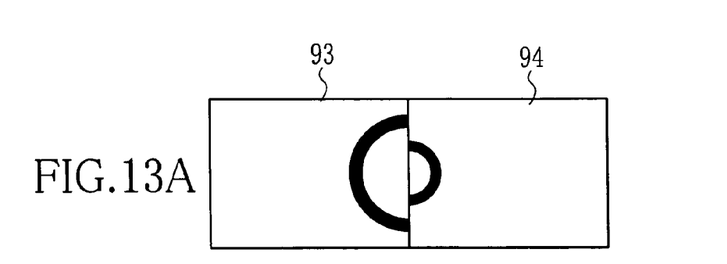
FIGS. 13A and 13B are explanatory diagrams illustrating how an image size controller adjusts the size of images shot by different imaging units.
Figure 13B:
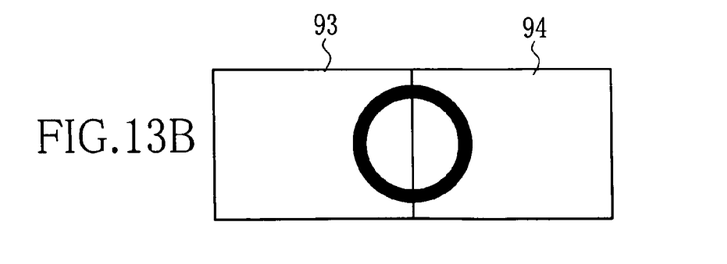

It is also possible to adjust the size of the images shot by the different imaging units insofar as they are shooting the same subject. For example, the same subject is shot by the first and second imaging unit 24 and 25, to obtain a first image 93 and a second image 94, as shown in FIG. 13A. Thereafter, the image size adjuster 53 compares the sizes of the common subjects contained in the first and second images 93 and 94 and calculates such a magnification that makes the common subjects have the same size in these images 93 and 94, as shown in FIG. 13B. The image size adjustment may be done not only between two images, but also among three or four images, like the gain control. Although the size of one image is changed in accordance with the size of the other image in the illustrated embodiment, it is possible to change the sizes of both images to adjust them to an intermediate size.

The images shot in the way as described above are converted through the display controller 51 into composite image signals, such as NTSC signals, to be displayed on the monitor 13. The image files recorded by the recording section 47 are read out by the reproduction processor 50, which expands the compressed images and feeds them to the display controller 51, to display the recorded images on the monitor 13. On displaying the images, if all the images are arranged in the same size on the monitor 13, it is difficult to grasp the arrangement of the scenes within the shooting space and the time sequence of these scenes.

Figure 14:
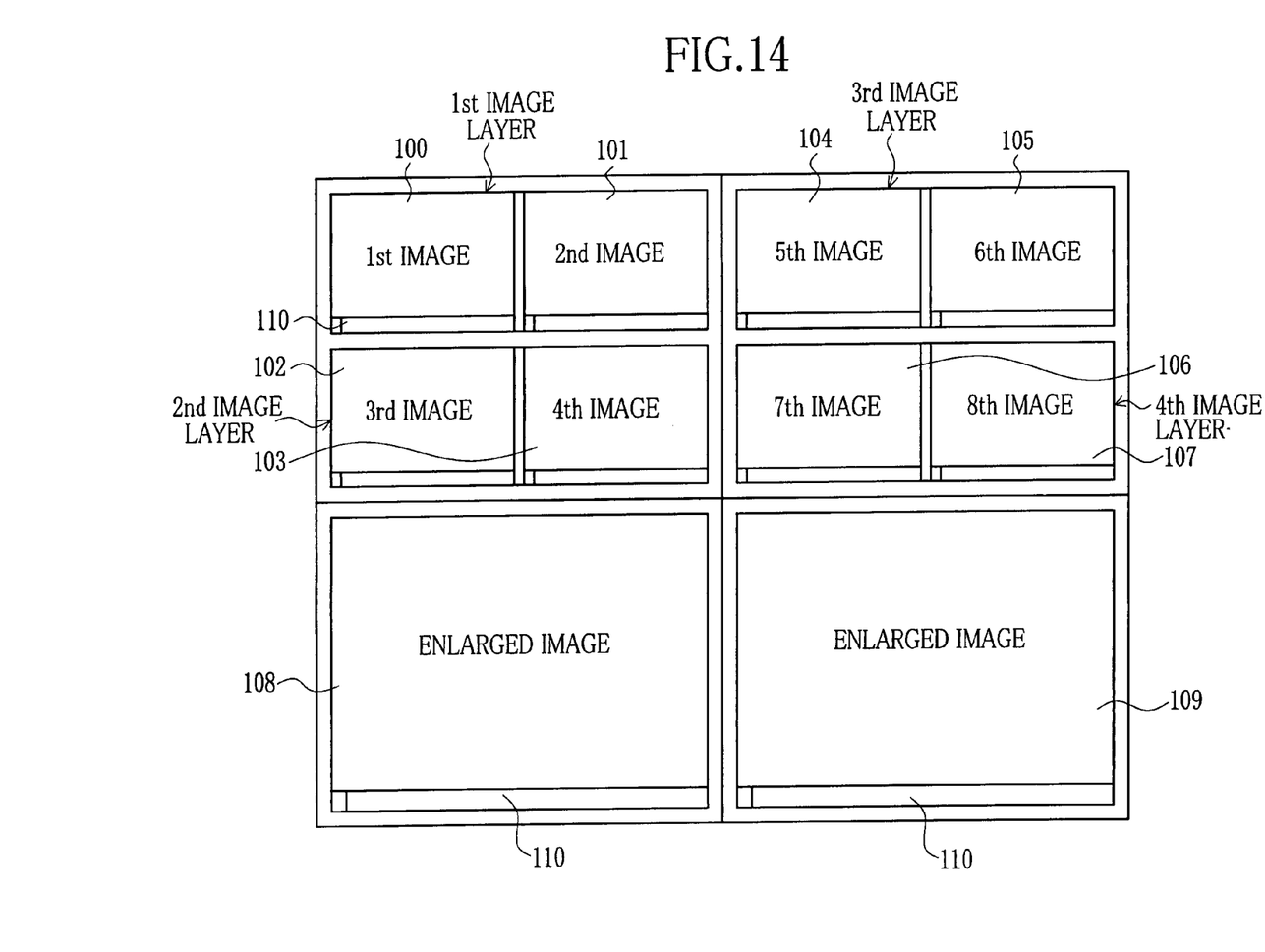
FIG. 14 is an explanatory diagram illustrating an example of arrangement of images on a monitor.

In view of this, according to an embodiment shown in FIG. 14, images 100, 101, 102, 103, 104, 105, 106 and 107, which are shot by the first to eighth imaging units 24 to 31, are coupled into pairs by the respective image layer units 17 to 20, to display them as first to fourth imaging layers, below which a couple of images 108 and 109 constituting a selected one of the first to fourth image layers, or a number of images as being subjected to an editorial treatment are displayed in an enlarged size. Thus, the operator can observe the images distinctively from one image layer unit to another, i.e. from one focal plane to another. So it is easy to grasp the respective scenes in the shooting space S. In addition to that, a counter bar 110 is displayed with each of the images 100 to 109. The counter bar 110 moves with the count of the recording time counter for each imaging unit, so it is easy to grasp the shooting time of each scene. Thus, it becomes easy to grasp the arrangement of the scenes within the shooting space S and the time sequence of these scenes, so the present embodiment makes it possible to edit or produce a wide-field movie from the images shot by the multi-focus camera 11 without any staggering of time axes between the images, a tracking movie that tracks a single subjects, a movie utilizing the deep depth of field, a movie with a wide dynamic range, and so forth.

Although the multi-focus camera of the above embodiment is provided with eight imaging units, to provide four focal planes, the number of imaging units and the number of focal planes are not limited to the above embodiment, but may be modified appropriately.

Thus, the present invention is not to be limited to the above embodiment but, on the contrary, various modification will be possible without departing from the scope of claims appended hereto.

What is claimed is:

1. A multi-focus camera comprising a number of imaging units, each of which has an imaging optical system and an imaging device, imaging optical systems of said imaging units being set to form respective focal planes at different distances from said multi-focus camera in a particular shooting space, wherein front depths of field of said imaging optical systems are set to be deep enough to reach those focal planes which are adjacent to and arranged on the camera side of the respective focal planes or a front face of the shooting space, and magnifications of said imaging optical systems are so defined that images of any subjects of the same size are taken in the same size regardless of the position of said focal planes;

wherein said imaging optical systems satisfy the following condition:

$$Ls_n - Ls_{n-1} \leq Df_n (n \geq 2)$$

wherein $Ls_n$ represents a distance from a focal plane that is in the n-th position from the front of the shooting space to an imaging unit that is focused on the n-th focal plane, $Df_n$ represents a front depth of field of the imaging optical system of the imaging unit that is focused on the n-th focal plane; and wherein said optical systems of said imaging units satisfy the following condition:

$$f_n = Ls_n \times m/(m+1)$$

wherein m and $f_n$ represent a magnification and a focal distance of the imaging optical system of the imaging unit that is focused on the n-th focal plane, respectively.

2. A multi-focus camera as claimed in claim 1, wherein at least two of said imaging units form an image layer unit such that said at least two imaging units of each image layer unit are focused on the same focal plane at different points from each other, to take images from different areas of the same focal plane.

* * * * *